United States Patent [19]

Pund

[11] 4,167,311
[45] Sep. 11, 1979

[54] PROJECTION SYSTEM AND PROCESS

[75] Inventor: Marvin L. Pund, Bel Nor, Mo.

[73] Assignee: McDonnell Douglas Corporation, St. Louis, Mo.

[21] Appl. No.: 895,601

[22] Filed: Apr. 12, 1978

[51] Int. Cl.² .................. G03B 21/28; G03B 21/56
[52] U.S. Cl. ................................ 353/99; 353/94; 353/122; 350/123; 350/125
[58] Field of Search ............... 350/123, 125; 353/99, 353/122, 11, 121, 94, 98; 35/12 N; 352/69, 70, 71

[56] References Cited

U.S. PATENT DOCUMENTS

| 2,299,682 | 10/1942 | Conant | 352/98 |
| 2,320,760 | 6/1943 | Surre | 350/123 |
| 3,107,577 | 10/1963 | Adams | 352/70 |
| 3,246,943 | 4/1966 | Holt | 353/99 |
| 3,248,165 | 4/1966 | Marks et al. | 350/123 |
| 3,378,327 | 4/1968 | Zaromb | 350/319 |
| 3,695,751 | 10/1972 | Watanuki | 352/70 |
| 3,807,849 | 4/1974 | Lobb | 353/98 |

*Primary Examiner*—Richard E. Aegerter
*Assistant Examiner*—John W. Shepperd

*Attorney, Agent, or Firm*—Gravely, Lieder & Woodruff

[57] ABSTRACT

A projector casts light rays upon a reflective surface to produce a focused scene, and within the periphery of the scene the reflective surface has a small aperture. Behind the aperture is a concave mirror which is positioned to intercept the projected rays that pass through the aperture. The mirror reflects these rays onto a small screen which is located adjacent to the aperture. The arrangement is such that the reflected rays come into focus at the small screen, producing a focused image of that portion of the scene seemingly lost at aperture. Light from this image is in turn reflected by the mirror so as to create a real image, the location of which is the aperture in the reflective surface. Thus, the real image of the small screen is observed at the void left in the reflective surface by the aperture and blends in with the remainder of the scene on that surface. As a result, the aperture is practically indiscernible. Another projector may be located behind the reflective surface to project a different scene through the aperture and onto another reflective surface located opposite the first reflective surface. A retractive optical system may be used in lieu of the mirror.

15 Claims, 4 Drawing Figures

PROJECTION SYSTEM AND PROCESS

BACKGROUND OF THE INVENTION

This invention relates in general to projection systems, and more particularly to a system for projecting an image on a surface having an exposed aperture therein while optically obscuring the aperture.

In most projecting systems, the projected image is cast upon a continuous surface of relatively high reflectivity. However, in some highly specialized systems, it is desirable to have an opening or aperture in the surface onto which the image is cast. This is particularly true in full or wide field-of-view projection systems.

For example, flight simulators for instructing and testing aircraft pilots utilize several projectors which cast images of simulated terrain and sky on a spherical surface or dome that is usually about 40 feet in diameter. Other projectors may cast images of nearby aircraft, clouds or targets. The simulated cockpit is at the center of the dome, and to reduce glare and impart a measure of reality to the simulated flight, all the projectors must be hidden from the student pilots field of vision. This presents little problem for those projectors used for the imagery directly ahead of the flight path, for those projectors may be located immediately in front of the cockpit. However, to broaden the field of view, it is either necessary to expose some of the projectors to the student pilot, in which case the realism is diminished and he subjected to glare, or else it is necessary to project through apertures in the surface of the dome, in which case the apertures stand out boldly in the projected scene.

SUMMARY OF THE INVENTION

One of the principal objects of the present invention is to provide a projection system which enables an image to be projected onto a surface having an aperture therein without the aperture being readily apparent. Another object is to provide a projection system of the type stated which enables an image to be projected through a surface onto which another image is cast without disrupting or distorting the other image. A further object is to provide a projection system of the type stated which affords high quality wide field projection. An additional object is to provide a projection system of the type stated which is ideally suited for projecting scenes and targets onto the spherical surface of the dome for a flight simulator. These and other objects will become apparent hereinafter.

The present invention is embodied in a projection system including a projector and a reflective surface on which the projector casts an image of a scene. The surface contains an aperture through which some of the light rays pass. The system also includes means for converting light rays which pass through the aperture onto a real image that appears to be located at the aperture, thereby obscuring the aperture. In addition, the invention is embodied in the process by which the aperture is obscured. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
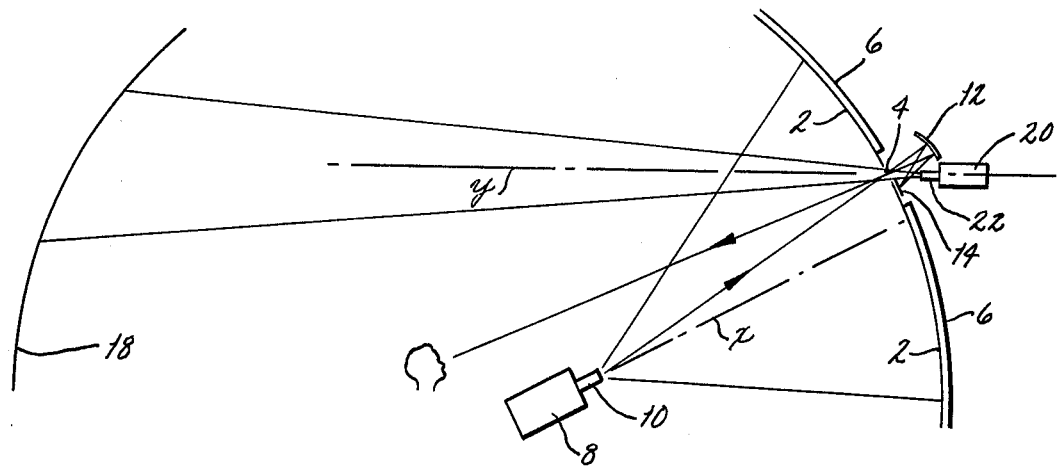
FIG. 1 is schematic view of a projection system that utilizes a concave mirror to produce an image at an aperture in a reflective surface so as to obscure the aperture.

Referring now to the drawings (FIG. 1), A designates a projection system or arrangement which in a broad sense is suitable for projecting an image on an apertured surface while rendering the aperture in the surface practically indiscernible. In a narrower sense, the system A is useful for projecting one image through a surface onto which another image is cast without any distortion or interruption of the other image. Indeed, one observing the surface onto which the other image is cast would not be aware that a projector exists behind that surface or that the projector projects its image through an aperture in the surface, for the aperture is optically obscured.

The projection system A includes (FIG. 1) a surface 2 of relatively high reflectivity, and this surface may be flat as a conventional movie screen or curved about a single axis as a panoramic movie screen, or it may be spherical as in the case of a dome for a flight simulator. Irrespective of its configuration, the surface 2 has an aperture 4 in it, with that aperture in the typical case measuring about 4×3 inches. The reflective surface 2 is actually on a wall 6 which in the vicinity of the aperture 4 is quite thin. The wall 6 may be sheet aluminum or some other sheet material.

Located in front of the reflective surface 2 on the wall 6 is a projector 8 having a lens system 10, the optical axis x of which is directed toward the reflective surface 2. The projector 8 may be a so-called light valve projector for projecting high intensity video images, or it may be a conventional movie, film strip, CRT, or slide projector. If the projection system A forms part of a flight simulator, then the projector 8 should be a light valve or CRT projector. In any event, the projector 8 produces an image which is directed toward and cast in focus upon the reflective surface 2 of the wall 6 such that the aperture 4 lies within the periphery of the image. Thus, while most of the light projected through the lens system 10 comes into focus at the surface 2 from which it is reflected to the eye of the observer as a scene, a very small portion of the light passes through the aperture 4 and beyond the wall 6.

Figure 2:
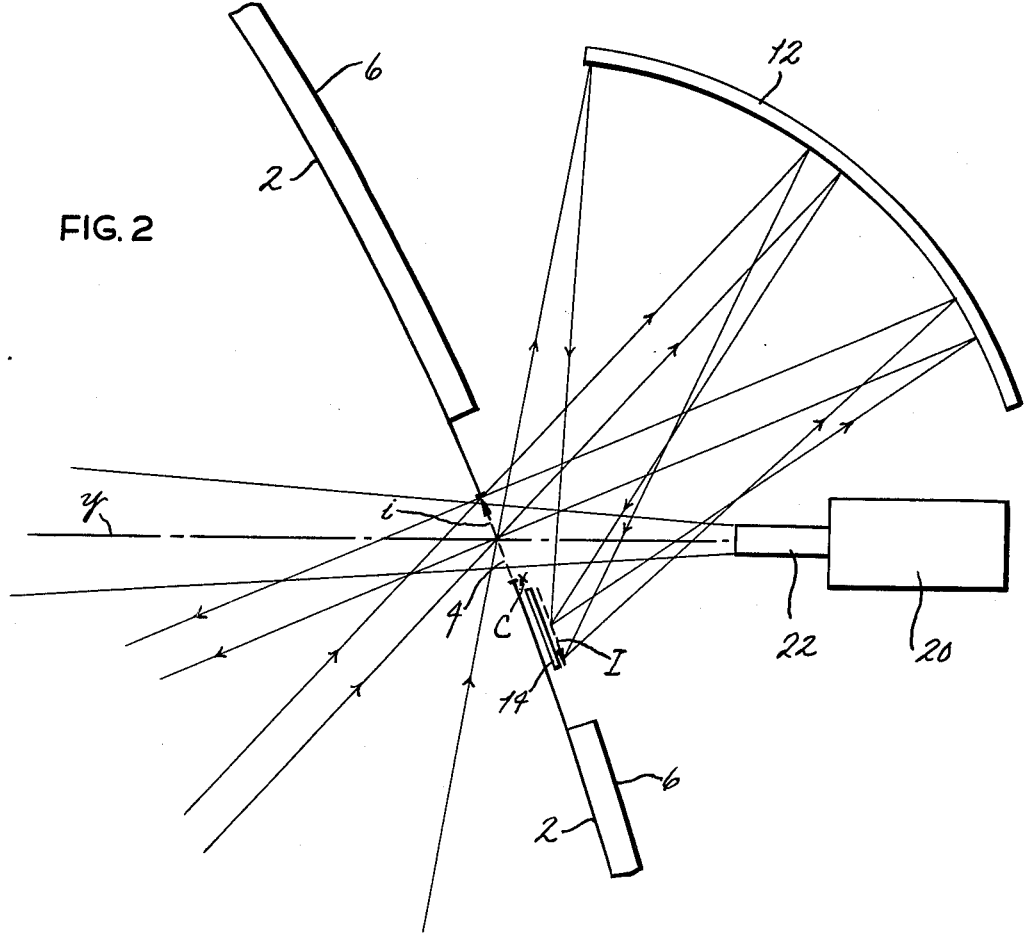
FIG. 2 is an enlarged schematic view showing the portion of the projection system centered at the aperture in the reflective surface.

The passage of light rays through the aperture 4 would leave a void in the projected scene were it not for a concave mirror 12 and a small screen 14 located beyond the wall 6 (FIG. 2). The screen 14 is located adjacent to the aperture 4 and as close to the reflective surface 2 as possible. For all practical purposes it is in the plane of the aperture 4, but faces away from the reflective surface 2. The mirror 12, on the other hand, is located beyond the aperture 4 and screen 14 with its concave reflective surface postioned to intercept the projected light rays passing through the aperture 4.

Indeed, the mirror 12 is oriented such that the projected rays are reflected toward and cast in focus upon the small screen 14. In other words, the concave mirror 12 produces on the small screen 14 an image I of the light rays that come into focus at the aperture 4. Preferably, the center of curvature c for the concave mirror 12 is adjacent to the aperture 4 and lies in the plane of the aperture 4. Since the screen 14 essentially at the center of curvature c for the mirror 12 and at the reflective surface 2 of the wall 6, the focused image I on the screen 14 is a real image, is inverted, and is about the size of the aperture 4.

One observing the projected scene from a location in front of the reflective surface 2, instead of seeing aperture 4, will observe the mirror 12 behind the aperture 4, or more specifically, a reflection cast by the mirror 12, and that reflection will be of the image I cast upon the small screen 14. Since the aperture 4 is at the center of curvature c for the convex mirror 12, the image I (FIG. 2) observed through the aperture 4 will be a real image, will be inverted with respect to the screen image I which places the observed image I right-side-up with respect to the projected scene, and will be the size of the aperture 4, thus making it correspond in size and proportion to the remainder of the projected scene. In other words, the image I that is observed through the aperture 4 will blend in with the remainder of the projected scene, thereby rendering the aperture 4 practically indistinguishable. Furthermore, by virtue of the concave configuration of the mirror 12 and its location, the image I that is cast upon the screen 14 may be observed from a wide range of locations in front of the reflective surface 2, so that the aperture 4 is for all practical purposes indiscernible irrespective of the location one assumes in front of the surface 2.

Thus the concave mirror 12 and the small screen 14 convert the light rays that pass through the aperture 4 into a real image I that appears to anyone observing the mirror 12 through the aperture 4 to be located at the aperture 4. The presence of the real image i at the aperture 4, in turn, disguises the aperture 4, since the image I blends in with the remainder of scene.

Inasmuch as the mirror 12 absorbs some of the light in both instances of reflection from it, the reflectivity of the small screen 14 should be somewhat greater than that of the reflective surface 2. Indeed, the difference in reflectivity between the screen 14 and the surface 2 should be such that the image I at the aperture 4 is about the same intensity or brightness as the image projected upon the reflective surface 2.

The small screen 14 and center of curvature c for the concave mirror 12 need not necessarily be in the plane of the aperture 4. For example, the small screen 14 may be located between the center of curvature c and the focal point of the mirror 12, in which case the center of curvature c should lie midway between the focal point and the plane of the aperture 4. The ultimate end, of course, is to have the image I of the small screen located at the aperture 4 in an upright disposition and at a size that corresponds to the adjacent portions of the scene that is projected upon the reflective surface 2.

Moreover, the real image produced at the aperture 4 need not come from a single projector 8 directed at the reflective surface 2, but may be derived from two or even more projectors casting superimposed images on the surface 2.

Figure 3:
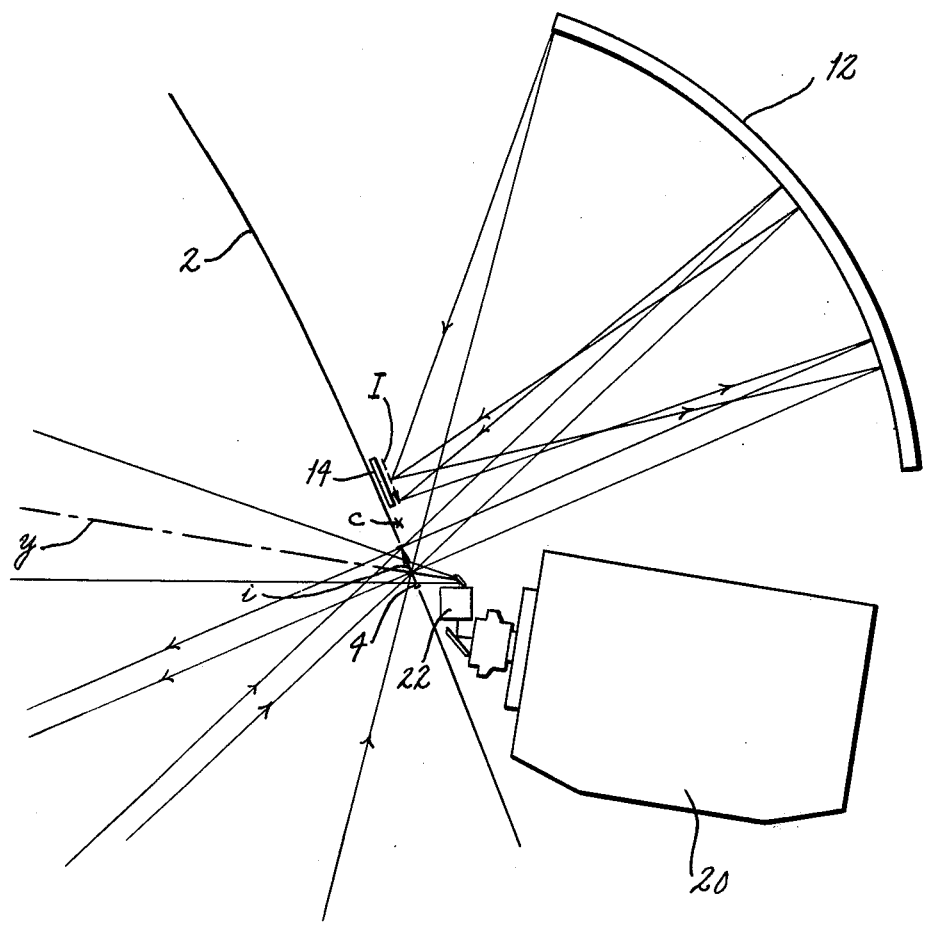
FIG. 3 is an enlarged schematic view similar to FIG. 2, but showing a modified arrangement of the components.

The aperture 4 in the surface 2 may be used for observation or other purposes, but is most useful for projection of another image on a reflective surface 18 (FIG. 1) located beyond and generally opposite to the surface 2. To this end, a projector 20 is located beyond the wall 6 and has a lens system 22, the optical axis y of which is aligned with the aperture 4, yet is disposed at an angle with respect to the optical axis x of the projector 8 so that the two projectors 8 and 20 do not project light directly at each other. The projector 20 may also be a light valve or CRT projector for producing video images. The components of the lens system 22 and the projector 20 may be arranged along a single optical axis (FIG. 2), in which case the concave mirror 12 must be offset somewhat upwardly or downwardly, or for that matter even laterally, to provide room for the projector 22. On the other hand, mirrors or prisms may be incorporated into the lens system 22 to offset the projector 20 somewhat from the aperture 4 (FIG. 3), in which case the concave mirror 12 may assume a more centered location behind aperture 4.

The projection system A lends itself ideally to wide field projection, particularly where it is necessary to completely encircle the viewer with imagery of substantial height as is the case in more sophisticated flight simulators.

Figure 4:
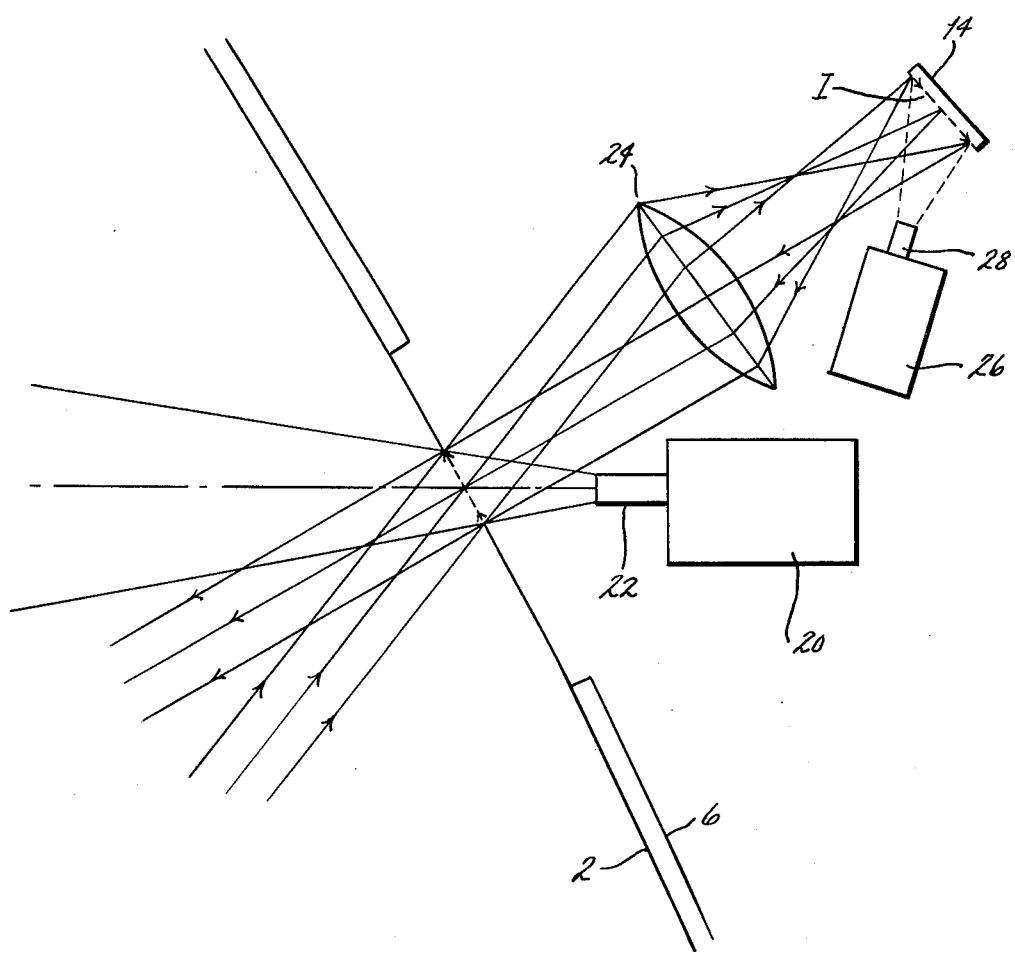
FIG. 4 is an enlarged schematic of a modified projection system that utilizes a retractive optical system to create an image at the aperture in the reflective surface instead of a mirror.

In a modified projection system B (FIG. 4) the light rays projected through the aperture 4 in the reflective surface 2 are not intercepted by a concave mirror, but instead pass through a refractive optical system 24 that casts them in focus on the small screen 14, which in this instance is located beyond the optical system 24. The image I is both real and inverted. The optical system 24 furthermore reproduces the image I as a real image I which is located at the aperture 4 in an upright orientation with its size and proportions corresponding to the remainder of the scene projected onto the surface 2. In effect the aperture 4 is obscured.

Also, still another projector 26 having a lens system 28 may be directed at the small screen 14 behind the refractive optical system 24 so that the image cast by that projector will be superimposed on the image derived from the projector 8. In this case the image I at the aperture 4 has the image from the projector 26 integrated into it.

This invention is intended to cover all changes and modifications of the example of the invention herein chosen for purposes of the disclosure which do not constitute departures from the spirit and scope of the invention.

What is claimed is:

1. A projection system comprising: a first reflective surface having an aperture therein; a first projector having a lens system directed toward the reflective surface for projecting a focused image of a scene on the reflective surface, the projector being oriented such that rays emanating from it will pass through the aperture; a mirror positioned behind the aperture to intercept the rays projected through the aperture; and a reflective screen surface offset from the aperture and located in front of the mirror; the mirror and reflective screen surface being positioned such that the rays intercepted by the mirror are reflected onto the screen to produce on the screen surface a focused image of that portion of the scene that would have otherwise appeared on the reflective surface at the area occupied by the aperture and such that the focused image on the screen surface is reflected off of the mirror and produces a real image of the scene portion at the aperture, whereby the aperture is to a large measure obscured.

2. A projection system according to claim 1 wherein the reflectivity of the screen surface is greater than the reflectivity of the first reflective surface.

3. A projection system according to claim 1 wherein the mirror is concave.

4. A projection system according to claim 3 wherein the screen surface and the center of curvature for the concave mirror are located generally in the plane of the aperture.

5. A projection system according to claim 3 wherein the center of curvature for the mirror is offset from the aperture.

6. A projection system according to claim 1 and further comprising a second reflective surface generally located opposite the first reflective surface and a second projector located behind the first reflective surface and having a lens system for projecting more light rays through the aperture in the first reflective surface and for casting those rays in focus on the second reflective surface so as to produce another scene on the second reflective surface.

7. A projection system comprising: a first reflective surface having an aperture therein; a first projector located in front of the reflective surface and having a lens system for projecting a focused image of a scene on the reflective surface, the projector being oriented such that rays emanating from it will pass through the aperture; a reflective screen surface located behine the first reflective surrace, and means located behind the aperture for intercepting the rays projected through the aperture and for casting those rays onto the reflective screen surface to form a focused image on said screen of the portion of the scene that would have otherwise appeared on the reflective surface at the area occupied by the aperture, said means further reproducing the image on said screen as a real image which is located in space and at the aperture such that it blends into the focused image projected onto the reflective surface, whereby the aperture is obscured.

8. A projection system according to claim 7 wherein the means located behind the aperture is a refractive optical system through which the rays from the aperture pass.

9. A projection system according to claim 8 and further comprising another projector having a lens system directed at the reflective screen surface so that the image derived from the other projector is superimposed on the image derived from the rays passing through the aperture.

10. A projection process comprising: projecting an image in focus upon a reflective surface so as to produce a scene on the surface, the surface having an aperture therein through which the light rays directed at the aperture pass; reflecting the light rays that pass through the aperture onto a screen; and reflecting the image on the screen such that a real image is produced at the aperture, whereby the aperture is to a large measure obscured.

11. A process according to claim 16 wherein both the light rays that pass through the aperture and the image on the screen are reflected from a concave mirror that is located behind the reflective surface and faces the aperture.

12. A process according to claim 11 wherein the center of curvature for the concave mirror is located no further forwardly than the reflective surface.

13. A projection process comprising: projecting an image in focus upon a reflective surface so as to produce a scene on the surface, the surface having an aperture therein through which the light rays directed at the aperture pass; intercepting the light rays that pass through the aperture and casting them in focus on a screen located behind the reflective surface with the rays that are so cast forming a real image of that much of the scene at which the aperture is located, and converting the image of the screen into a real image which is located in space and at the aperture such that it blends into the focused image along the reflective surface, whereby the aperture is to a large measure obscured.

14. A process according to claim 13 and further comprising projecting more light rays through the aperture from behind the reflective surface and onto another reflective surface that is located generally opposite the reflective surface containing the aperture.

15. A process according to claim 13 wherein the step of intercepting the light rays that pass through the aperture and casting them on a screen comprises: directing the light rays through a refractive optical system and the step of converting the image of the screen also comprises passing rays through the refractive optical system to reproduce the image that is on the screen as a real image which is lcoated in space at the aperture.

* * * * *

UNITED STATES PATENT AND TRADEMARK OFFICE
CERTIFICATE OF CORRECTION

PATENT NO. : 4,167,311

DATED : Sept. 11, 1979

INVENTOR(S) : Marvin L. Pund

It is certified that error appears in the above-identified patent and that said Letters Patent are hereby corrected as shown below:

Col. 5, line 28, after "located" and before "the", delete "behine" and substitute therefor -- "behind"

Col. 6, line 29, after "located", delete the comma (,) and insert a semi-colon ";".

Col. 6, line 30, after "image" (first occurrence), delete the phrase "of the screen" and substitute therefor -- "on the screen"

Col. 6, line 43 -- after "image", delete the phrase "of the screen" and substitute therefor -- "on the screen"

Signed and Sealed this

Fourth Day of December 1979

[SEAL]

Attest:

SIDNEY A. DIAMOND

*Attesting Officer*    *Commissioner of Patents and Trademarks*